M. J. GRIFFIN.
HORSESHOE CALK.
APPLICATION FILED MAR. 3, 1917.
1,264,919.
Patented May 7, 1918.
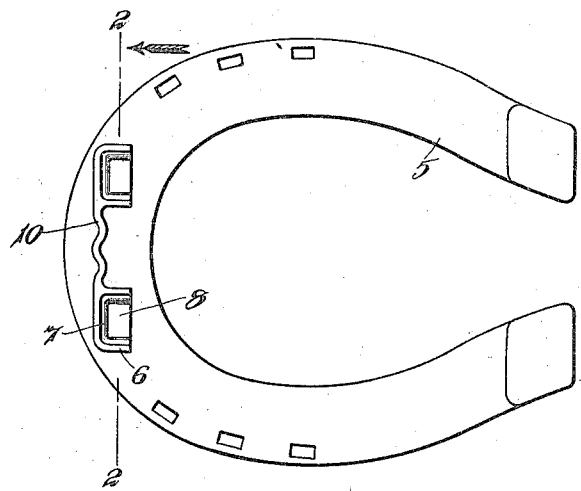
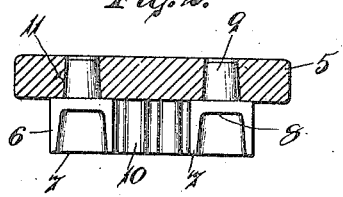
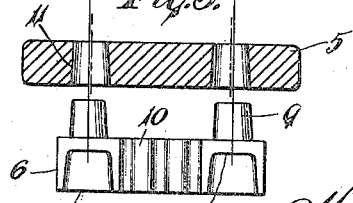
INVENTOR.
Michael J. Griffin,
BY
Arthur B. Jenkins,
ATTORNEY.

UNITED STATES PATENT OFFICE.

MICHAEL J. GRIFFIN, OF HARTFORD, CONNECTICUT.

HORSESHOE-CALK.

1,264,919.    Specification of Letters Patent.    Patented May 7, 1918.

Application filed March 3, 1917. Serial No. 152,335.

*To all whom it may concern:*

Be it known that I, MICHAEL J. GRIFFIN, a citizen of the United States, residing at Hartford, in the county of Hartford and State of Connecticut, have invented a new and Improved Horseshoe-Calk, of which the following is a specification.

My invention relates to the class of devices that are attached to horseshoes to prevent slipping, and an object of my invention, among others, is to provide a device of this class having characteristics to cause it to remain in place on a shoe, and that may be readily affixed to the shoe and that shall be extremely effective for the purposes for which it is designed.

One form of device embodying my invention and in the construction and use of which the objects herein set out, as well as others, may be attained, is illustrated in the accompanying drawings, in which—

Figure 1 is a bottom view of a horseshoe showing my improved calk attached thereto.

Fig. 2 is a view in section through the shoe on plane denoted by dotted line 2—2 of Fig. 1.

Fig. 3 is a view similar to Fig. 2 but showing differences that usually exist in the distance between the shanks of the calk and the holes in the shoe before the calk is driven to place.

In the accompanying drawings the numeral 5 indicates a horseshoe that may be of usual form and construction and that may have any suitable means for attaching it to the hoof of an animal.

A common practice at the present time is to make the shoe calks as separate articles of manufacture and to attach these to the shoes after they have been fitted to the hoof of the animal. A common form of calk embodies a tapered shank that is driven into a hole in the shoe made for its reception, the calk being held in place by friction only. It has been found, however, that this frictional contact is not sufficient to retain the calks in place and that they often become loose and displaced.

I have found that by securing a number of these calks together the holding means is much more effective than in a single calk, as each calk acts as an aid to retain the other calk in place, and the calks are, therefore, more securely held in the shoe and become displaced much less frequently. The holes for the calks are formed in the shoes when the latter are made, and the calks are formed as separate articles of manufacture. While it is possible to construct the calks so that the distance between the axial centers of the shanks and the axial centers of the holes in the shoes shall be approximately the same it is practically impossible to make them so that they will be alike, and even if so made, in fitting the shoe to the hoof of an animal the distance between the centers of the holes will be changed and with a rigid tie between the calks it would seldom be found that after the shoe had been fitted a calk could be driven to place in the holes provided for it. The tapered shape of the calk shanks, however, is such as to enable the extreme ends of the shanks to all enter the holes made for them in most instances, the variations in the holes in the shoe being so slight as to permit this.

The spurs 6 of my improved calk are formed hollow and preferably open on one side, this providing a holding edge 7 extending around the edge of the spur and a driving surface 8 located at the base of the spur and directly over the shanks 9. A tie 10 connects the spurs, this tie preferably constituting an extension of the closed side of said spurs and this tie is so formed that it will expand or contract under sufficient force to change the distance between the axial centers of the shanks 9.

The tie will be composed of a metal sufficiently ductile to enable this stretching or contracting action, which action will also be aided by making up the tie of reversed bends, as illustrated in the drawings.

In placing my improved calk on a shoe it will be found that the tapered shape of the calks is such as to permit their extreme ends to be entered in the holes 11 in the shoe, the variation in distance between the holes, in fitting the shoe, generally being so slight as to permit this insertion of the tips at the ends of the shanks. The tie 10 is constructed to yield to the force of the blows employed to drive the calks to place and to permit the calks to separate or close toward each other sufficiently to permit the calks to be driven firmly and tightly to place in the holes 11, and when so driven the calks will be more securely fastened in place against removal.

In driving these calks a tool of sufficient size to enable it to be inserted into the spur is employed, its end being placed against the driving surface 8 of the calk, or a forked tool may be employed, having branches to be inserted in two or more calks so that they may be simultaneously driven.

In accordance with the provisions of the patent statutes, I have described the principles of operation of my invention, together with the device which I now consider to represent the best embodiment thereof; but I desire to have it understood that the device shown is only illustrative and that the invention can be carried out by other means.

I claim—

1. A horseshoe having a pair of holes therein and a shoe calk comprising shanks and spurs, the former being of tapered form to permit entry into said holes when located at variable distances apart, and a tie uniting the spurs and of a structure to permit variation in the distance between said shanks.

2. A shoe calk comprising shanks and spurs, the former being of tapered form to permit entry into holes in a shoe located at variable distances apart, and a tie uniting the spurs and of a structure to permit variation in the distance between said shanks.

3. A shoe calk comprising shanks and spurs, the former being tapered to permit entry into holes in a shoe located at variable distances apart and also for a driving fit in holes in a shoe, and a tie of curved form to permit a variation in the distance between the shanks, whereby they may be tightly driven into holes in the shoes with varying distances between said holes.

4. A shoe calk comprising shanks and spurs, the former being tapered to permit entry into holes in a shoe located at variable distances apart and also to be driven into holes in shoes, and a tie connecting the spurs and having reversed bends adapting the spurs to change their relative positions whereby the shanks may be tightly driven into holes in shoes having varying distances between them.

MICHAEL J. GRIFFIN.

Copies of this patent may be obtained for five cents each, by addressing the "Commissioner of Patents, Washington, D. C."